United States Patent
Lee et al.

(10) Patent No.: US 9,774,774 B2
(45) Date of Patent: Sep. 26, 2017

(54) IMAGE PICKUP APPARATUS

(71) Applicants: Chen-Cheng Lee, Hsin-Chu (TW); Hsin-Te Chen, Hsin-Chu (TW); Kuo-Chuan Wang, Hsin-Chu (TW); Yuan-Yu Lee, Hsin-Chu (TW)

(72) Inventors: Chen-Cheng Lee, Hsin-Chu (TW); Hsin-Te Chen, Hsin-Chu (TW); Kuo-Chuan Wang, Hsin-Chu (TW); Yuan-Yu Lee, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 235 days.

(21) Appl. No.: 14/520,147

(22) Filed: Oct. 21, 2014

(65) Prior Publication Data

US 2016/0112613 A1    Apr. 21, 2016

(51) Int. Cl.
| | |
|---|---|
| *H04N 5/262* | (2006.01) |
| *G02B 13/16* | (2006.01) |
| *H04N 5/225* | (2006.01) |
| *H04N 5/232* | (2006.01) |
| *H04N 5/33* | (2006.01) |
| *H04N 5/238* | (2006.01) |

(52) U.S. Cl.
CPC .......... *H04N 5/2254* (2013.01); *H04N 5/238* (2013.01); *H04N 5/23212* (2013.01); *H04N 5/23245* (2013.01); *H04N 5/33* (2013.01); *H04N 5/332* (2013.01)

(58) Field of Classification Search
None
See application file for complete search history.

(56) References Cited

U.S. PATENT DOCUMENTS

| | | | | |
|---|---|---|---|---|
| 3,305,294 | A * | 2/1967 | Alvarez | ............... G02B 3/00 351/159.42 |
| 3,583,790 | A * | 6/1971 | Baker | ............... G02B 3/0081 351/159.47 |
| 6,320,699 | B1 * | 11/2001 | Maeda | ............... G02B 5/3083 359/637 |
| 6,553,156 | B1 * | 4/2003 | Li | ............... G02B 6/2746 359/484.05 |
| 7,149,039 | B2 | 12/2006 | Shimakura | |

(Continued)

FOREIGN PATENT DOCUMENTS

| | | |
|---|---|---|
| TW | M311038 U | 5/2007 |
| TW | M371242 | 12/2009 |

(Continued)

*Primary Examiner* — Hung Dang
(74) *Attorney, Agent, or Firm* — Muncy, Geissler, Olds & Lowe, P.C.

(57) ABSTRACT

An image pickup apparatus includes a lens, an image sensor, an optical filter, and a driving device. The lens focuses light beams from at least one subject to form an optical image, and the image sensor receives the optical image and converts the optical image into at least one electric signal. The optical filter includes a first plate and a second plate, the first plate is disposed between the lens and the image sensor, and the second plate is disposed between the first plate and the image sensor. The driving device moves the second plate. The second plate has substantially the same index of refraction as the first plate, and a thickness of the second plate is continuously decreased or increased across the second plate.

12 Claims, 6 Drawing Sheets

(56) References Cited

U.S. PATENT DOCUMENTS

| | | | |
|---|---|---|---|
| 7,158,323 B2 | 1/2007 | Kim et al. | |
| 7,746,585 B2 | 6/2010 | Chang | |
| 7,911,528 B2 | 3/2011 | Kawada | |
| 8,248,692 B2 | 8/2012 | Wu | |
| 2001/0026400 A1* | 10/2001 | Yoshikawa | G02B 23/12 359/676 |
| 2005/0001034 A1* | 1/2005 | He | G06K 7/10811 235/454 |
| 2010/0079765 A1* | 4/2010 | Kraus | G01J 3/36 356/454 |
| 2011/0317276 A1* | 12/2011 | Koga | G02B 27/0068 359/654 |
| 2013/0138208 A1* | 5/2013 | Simonov | A61F 2/1624 623/6.11 |
| 2014/0211148 A1* | 7/2014 | Crosby | G02C 7/028 351/159.7 |
| 2014/0327947 A1* | 11/2014 | Lin | G02B 26/103 359/210.1 |
| 2016/0025630 A1* | 1/2016 | Jensen | B01L 7/52 506/9 |

FOREIGN PATENT DOCUMENTS

| | | |
|---|---|---|
| TW | M441135 U | 11/2012 |
| TW | M443188 | 12/2012 |
| TW | M443189 | 12/2012 |

\* cited by examiner

IMAGE PICKUP APPARATUS

BACKGROUND OF THE INVENTION a. Field of the Invention

This relates generally to an image pickup apparatus, and more particularly, to an image pickup apparatus having an optical filter.

b. Description of the Related Art

Typically, optical aberrations are generated in an image pickup apparatus because a light flux emitted from one point of an object forms an image with some divergence on an image pickup surface of an image sensor. Among the optical aberrations, chromatic aberrations may result in lateral color shift due to difference in image capturing magnifications for respective light wavelengths. Such position shift of the light rays focused on the image sensor may cause errors especially to light field information, which makes it difficult to produce a reconstructed image with good accuracy.

BRIEF SUMMARY OF THE INVENTION

The invention provides an image pickup apparatus having an optical filter.

Other objects and advantages of the invention can be better understood from the technical characteristics disclosed by the invention. In order to achieve one of the above purposes, all the purposes, or other purposes, one embodiment of the invention provides an image pickup apparatus including a lens, an image sensor, an optical filter, and a driving device. The lens focuses light beams from at least one subject to form an optical image, and the image sensor receives the optical image and converts the optical image into at least one electric signal. The optical filter is disposed in a light path of the light beams and between the lens and the image sensor, and the optical filter includes a first plate and a second plate. The first plate is disposed between the lens and the image sensor, and the second plate is disposed between the first plate and the image sensor. The second plate has substantially the same index of refraction as the first plate. The second plate has a first surface and a second surface opposite the first surface, the second surface forms an angle with the first surface, and a thickness of the second plate is continuously decreased or increased across the second plate. The driving device moves the second plate, and a total optical path length between the lens and the image sensor varies according to a position of the second plate relative to the first plate.

In one embodiment, the light beams include at least one infrared ray and at least one visible ray. The infrared ray is focused on the image sensor at a first position, the visible ray is focused on the image sensor at a second position, and a difference between the first position and the second position is adjusted through the movement of the second plate.

In one embodiment, each of the first surface and the second surface of the second plate is a planar surface, the first surface is substantially perpendicular to an optical axis of the image pickup apparatus, and the thickness of the second plate varies along a direction substantially perpendicular to the optical axis.

In one embodiment, the second surface of the second plate is an arc surface.

In one embodiment, the second plate is moved in a direction substantially perpendicular to the optical axis of the image pickup apparatus.

In one embodiment, the first plate has a first surface and a second surface opposite the first surface, and the second surface forms an angle with the first surface of the first plate. The first surface of the first plate is substantially parallel to the first surface of the second plate, and the second surface of the first plate is adjacent to and substantially parallel to the second surface of the second plate.

In one embodiment, a longitudinal direction of the second plate is substantially parallel to a longitudinal direction of the first plate, and the first plate and the second plate may have an identical sectional shape.

According to another embedment of the invention, an image pickup apparatus including a lens, an image sensor, an optical filter, and a driving device. The lens focuses light beams from at least one subject to form an optical image, and the image sensor receives the optical image and converts the optical image into at least one electric signal. The optical filter is disposed in a light path of the light beams and between the lens and the image sensor, and the optical filter includes a first plate and a second plate. The first plate is disposed between the lens and the image sensor, and the second plate is disposed between the first plate and the image sensor. The driving device moves the second plate, and a total optical path length between the lens and the image sensor continuously varies through the movement of the second plate relative to the first plate.

In one embodiment, the second plate is moved in a direction substantially perpendicular to an optical axis of the image pickup apparatus. A thickness of the second plate is continuously decreased or increased in a longitudinal direction of the second plate.

In one embodiment, the second plate may be a gradient-index optics, and a refractive index of the second plate gradually varies in the direction substantially perpendicular to an optical axis of the image pickup apparatus.

In one embodiment, the second plate is moved in a direction substantially parallel to an optical axis of the image pickup apparatus. The first plate and the second plate are spaced apart by a fluid layer, and a thickness of the fluid layer is substantially equal to an interval between the first plate and the second plate.

According to the above embodiments, since a total optical path length between the lens and the image sensor may vary according to a position of the second plate relative to the first plate, a focusing distance from the lens on the optical axis is finely-tuned to allow for a sharpest image of the subject projected onto the image sensor through the movement of the second plate. Under the circumstance, high focusing accuracy is achieved without the need of moving the lens. Besides, different wavelengths of light, like infrared rays and visible rays, may be focused at different points on the optical axis or at different positions in the focal plane to result in focus shift or focus distortion. According to the above embodiment, since a total optical path length between the lens and the image sensor may continuously vary through the movement of the second plate, different wavelength bands of light beams entering the lens can be focused at accurate positions on the image sensor to reduce aberrations. Further, since the thickness of the second plate is continuously decreased or increased to adjust a total optical path length between the lens and the image sensor in a continuous manner, a discontinuous image stream would not be formed in the case of switching between a daytime mode (mainly using visible wavelength band) and a nighttime mode (mainly using infrared wavelength).

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

Figure 1:
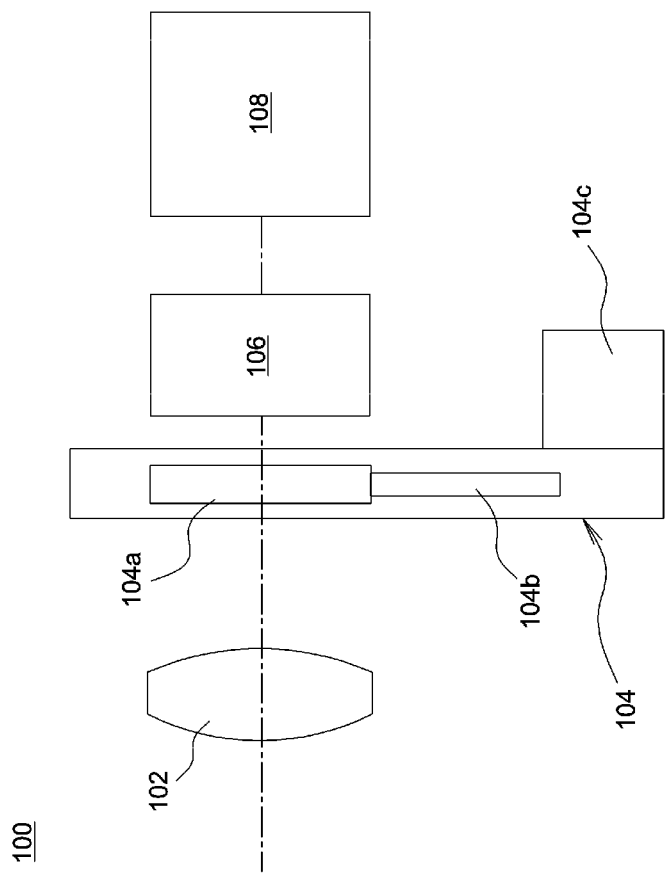
FIG. 1 illustrates an image pickup apparatus including an optical filter switching apparatus.

As shown in FIG. 1, an image pickup apparatus 100 may include a lens 102, an optical filter switching apparatus 104, an image sensor 106, and an image signal processor 108. The optical filter switching apparatus 104 includes an infrared-cut filter 104a, an infrared-pass filter 104b, and a driving device 104c. The driving device 104c may respectively move the infrared-cut filter 104a and the infrared-pass filter 104b to a position between the lens 102 and the image sensor 106. The infrared-cut filter 104a with a comparatively large thickness is capable of filtering out infrared light, and the infrared-pass filter 104b with a comparatively small thickness is capable of transmitting infrared light. The image sensor 106 converts the image information passing through the infrared-cut filter 104a or the infrared-pass filter 104b into an electrical signal. The image signal processor 108 converts the electric signal into a video image signal and outputs the video image signal to a CCTV or a monitoring system (not shown). The filters 104a and 104b may be made of a glass plate with a determined thickness for a specific wavelength band.

Figure 2:
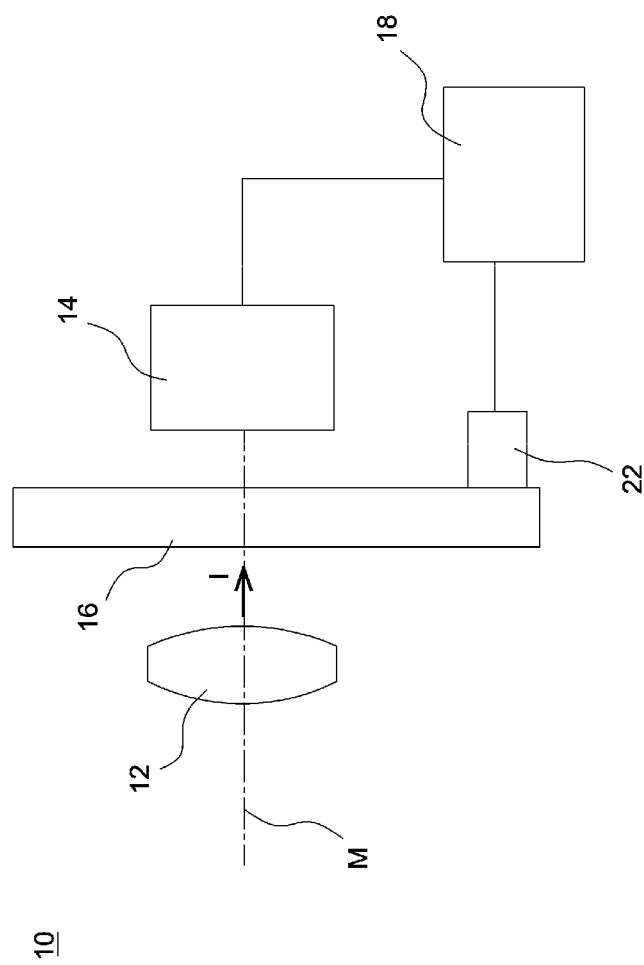
FIG. 2 illustrates an exemplary image pickup apparatus according to various embodiments of the invention.

FIG. 2 illustrates an exemplary image pickup apparatus according to various embodiments of the invention. In this example, the image pickup apparatus 10 includes a lens 12, an image sensor 14, an optical filter 16, a control circuit 18, and a driving device 22. The lens 12 focuses light beams I from at least one subject on the image sensor 14 to form an optical image, and the image sensor 14 receives and then converts the optical image into at least one electric signal. The image sensor 14 can be, for example, a charge-coupled device (CCD) or a complementary metal oxide semiconductor (CMOS). The optical filter 16 is disposed in a light path of the light beams I and between the lens 12 and the image sensor 14. The optical filter 16 is allowed to gradually vary a total optical path length between the lens 12 and the image sensor 14 through the position change of one or more components of the optical filter 16, and the position change may be realized by the driving device 22 such as a motor. The control circuit 18 may convert the electric signal into a video image signal and output the video image signal to a CCTV or a monitoring system (not shown), and may transmit a control signal to the driving device 22 to control the position of the optical filter 16.

Figure 3A:
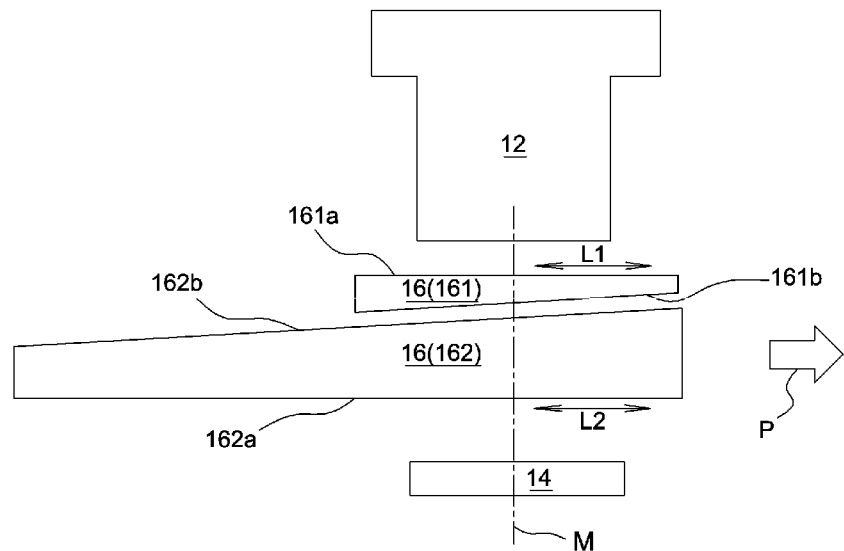
FIG. 3A and FIG. 3B illustrate an exemplary configuration of an optical filter according to an embodiment of the invention.
Figure 3B:
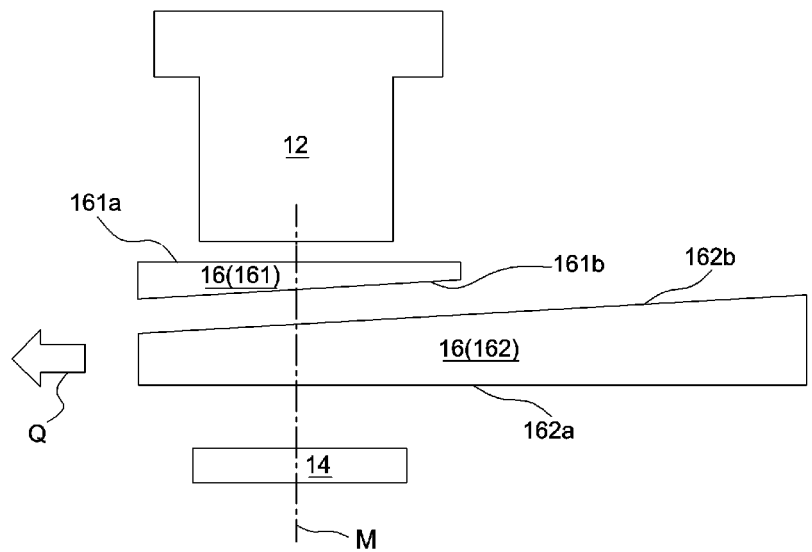

FIG. 3A and FIG. 3B illustrate an exemplary configuration of the optical filter 16 according to an embodiment of the invention. Referring to FIG. 3A and FIG. 3B, the optical filter 16 may include a first plate 161 and a second plate 162, and the second plate 162 may have substantially the same index of refraction as the first plate 161. The first plate 161 is disposed between the lens 12 and the image sensor 14, and the second plate 162 is disposed between the first plate 161 and the image sensor 14. In this embodiment, a longitudinal direction L1 of the first plate 161 is substantially parallel to a longitudinal direction L2 of the second plate 162. The first plate 161 has a surface 161a substantially perpendicular to the optical axis M of the image pickup apparatus 10 and a surface 161b opposite and forming an angle with the surface 161a. The second plate 162 has a surface 162a substantially perpendicular to the optical axis M and a surface 162b opposite and forming an angle with the surface 161a. The first plate 161 and the second plate 162 may have an identical sectional shape (such as a trapezoid), and the inclined surface 161b of the first plate 161 may be adjacent to and substantially parallel to the inclined surface 162b of the second plate 162. In this embodiment, the inclined surface 162b enables the second plate 162 to have a continuously decreased or increased thickness across the second plate 162. Therefore, when the second plate 162 is shifted relative to the first plate 161 in a direction P (FIG. 3A) or a direction Q (FIG. 3B), a thickness of the second plate 162 measured on the optical axis M is continuously changed to continuously vary a total optical path length between the lens 12 and the image sensor 14. The term "continuously", as used herein, refers to the property that the absolute value of the numerical difference between the value (such as the thickness or optical path length) at a given point and the value at any point in a neighborhood of the given point can be made as close to zero as desired by choosing the neighborhood small enough.

Therefore, since a total optical path length between the lens 12 and the image sensor 14 may vary according to a position of the second plate 162 relative to the first plate 161, a focusing distance from the lens 12 on the optical axis M is finely-tuned to allow for a sharpest image of the subject projected onto the image sensor 14 through the movement of the second plate 162. Under the circumstance, high focusing accuracy is achieved without the need of moving the lens 12. Besides, different wavelengths of light, like infrared rays and visible rays, may be focused at different points on the optical axis or at different positions in the focal plane to result in focus shift or focus distortion. According to the above embodiment, since a total optical path length between the lens 12 and the image sensor 14 may continuously vary through the movement of the second plate 162, different wavelength bands of light beams entering the lens 12 can be focused at accurate positions on the image sensor 14 to reduce aberrations. Further, since the thickness of the second plate 162 is continuously decreased or increased to adjust a total optical path length between the lens and the image sensor in a continuous manner, a discontinuous image stream would not be formed in the case of switching between a daytime mode (mainly using visible wavelength band) and a nighttime mode (mainly using infrared wavelength).

Figure 4:
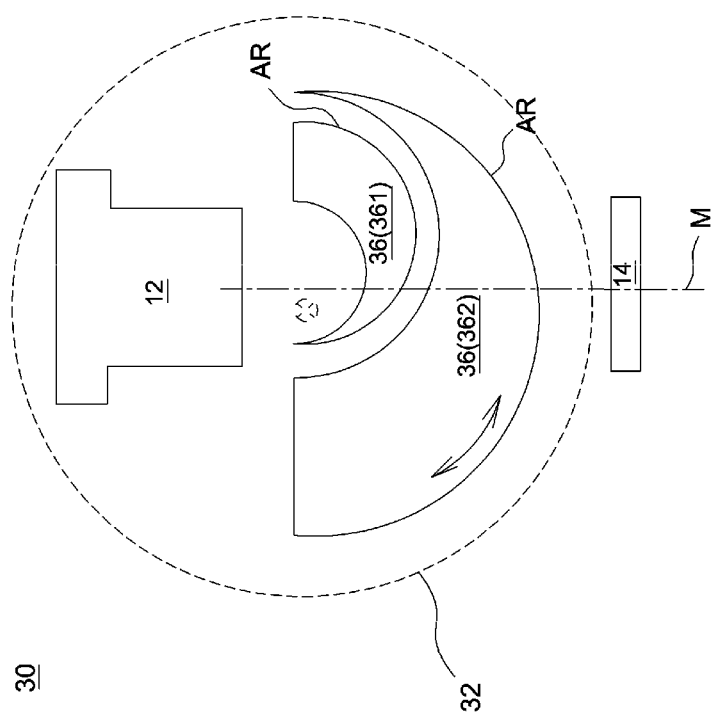
FIG. 4 illustrates an exemplary configuration of an optical filter according to another embodiment of the invention.

Note a surface arranged to vary a thickness of the second plate is not limited to an inclined planar surface shown in FIG. 3A and FIG. 3B. FIG. 4 illustrates an exemplary configuration of an optical filter according to another embodiment of the invention. Referring to FIG. 4, an optical filter 36 of an image pickup apparatus 30 includes a first plate 361 and a second plate 362, and each of the first plate 361 and the second plate 362 has at least one arc surface AR. A thickness of the second plate 362 may be continuously decreased or increase along a circumferential direction of the second plate 362, and the second plate 362 may be mounted on a driving device 32 such as a rotating wheel to rotate in the clockwise or counterclockwise direction and thus continuously vary the thickness measured on the optical axis M.

Figure 5:
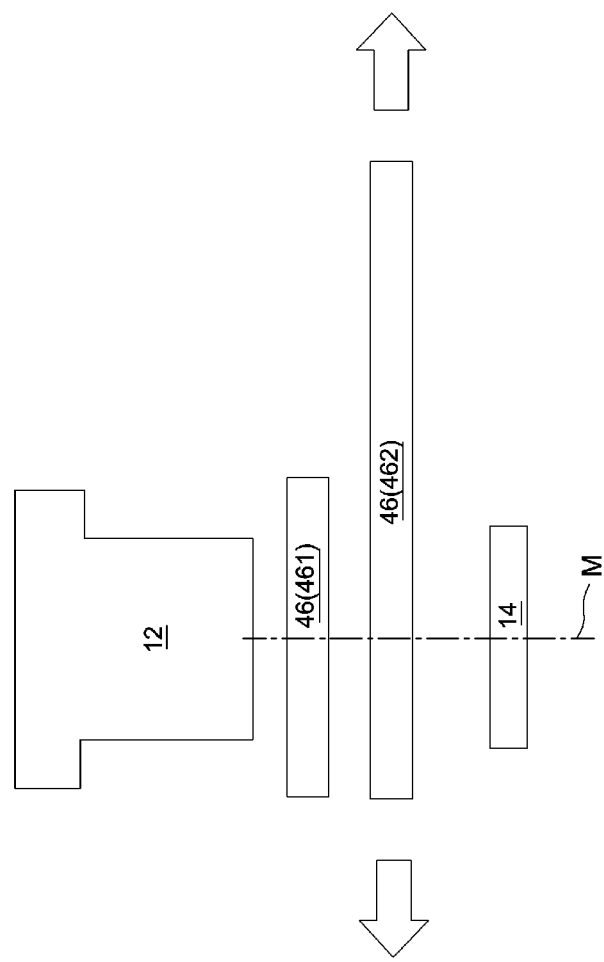
FIG. 5 illustrates an exemplary configuration of an optical filter according to another embodiment of the invention.

FIG. 5 illustrates an exemplary configuration of an optical filter according to another embodiment of the invention. Referring to FIG. 5, an optical filter 46 includes a first plate 461 and a second plate 462, and the second plate 462 may be shifted relative to the first plate 461 in a direction substantially perpendicular to an optical axis M of the image pickup apparatus 40 to continuously vary an optical path length. In this embodiment, at least the second plate 462 is a gradient-index (GRIN) optics, and a refractive index of the second plate 462 may gradually vary in a direction substantially perpendicular to an optical axis M of the image pickup apparatus 40. In an alternate embodiment, the optical filter 46 may be an integrated optics without a moving part. For example, the optical filter 46 may be an optical lens with a variable focal length having a multi-phase liquid composition. The multi-phase liquid composition may include a conductive fluid and a non-conductive fluid, the non-conductive fluid is immiscible in the conductive fluid, and the curvature of an interface formed between the non-conductive fluid and conductive fluid may vary, upon being applied with a voltage, to change the focal length of the optical lens.

Figure 6:
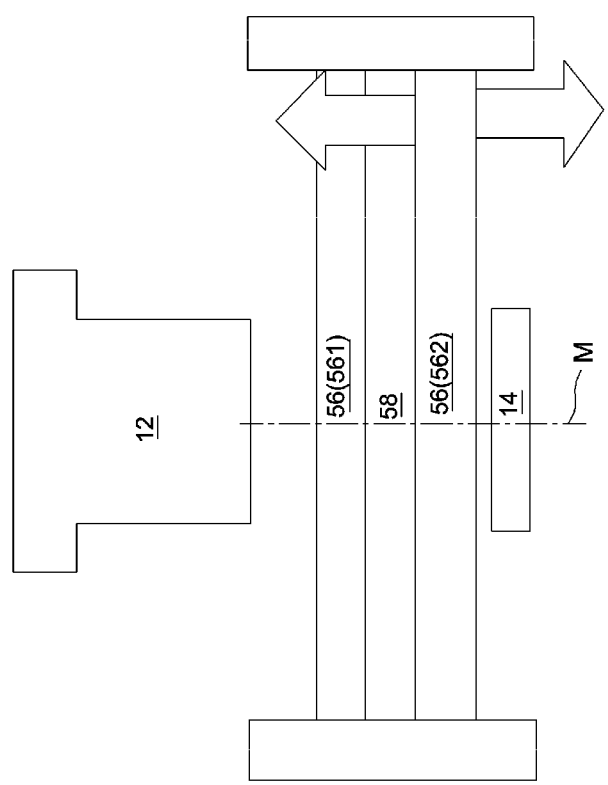
FIG. 6 illustrates an exemplary configuration of an optical filter according to another embodiment of the invention.

FIG. 6 illustrates an exemplary configuration of an optical filter according to another embodiment of the invention. Referring to FIG. 6, an optical filter 56 includes a first plate 561, a second plate 562, and a fluid layer 58 interposed and confined between the first plate 561 and the second plate 562. The fluid layer 58 may adjoin the first plate 561 and the second plate 562 such that a thickness of the fluid layer 58 is substantially equal to an interval between the first plate 561 and the second plate 562. In this embodiment, the second plate 562 may be moved relative to the first plate 561 in a direction substantially parallel to an optical axis M of the image pickup apparatus 50 to change the thickness of the fluid layer 58 and therefore continuously vary the optical oath length between the lens 12 and the image sensor 14.

In one embodiment, each of the first plate and the second plate of an optical filter may be made of, for example, plastic or glass. In one embodiment, the first plate is fixed, and the second plate is movable. However, this is not limited. The first plate and the second plate may be both movable, as long as a total optical path length between the lens and the image sensor is allowed to continuously vary.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An image pickup apparatus, comprising:
   a lens for focusing light beams from at least one subject to form an optical image;
   an optical filter disposed in a light path of the light beams for transmitting the light beams focused by the lens, wherein the optical filter comprises:
     a first plate having an arc surface disposed adjacent to the lens; and
     a second plate having an arc surface disposed adjacent to the first plate, the light beams focused by the lens passing through the first plate and the second plate in succession, and a thickness of the second plate being continuously decreased along the arc surface of the second plate; and
   a driver for rotating the second plate, and the second plate being rotated and entirely moved to different positions alongside the arc surface of the first plate to vary an optical path length.

2. The image pickup apparatus as claimed in claim 1, wherein the light beams comprise at least one infrared ray and at least one visible ray, the infrared ray is focused on an image sensor at a first position, the visible ray is focused on the image sensor at a second position, and a difference between the first position and the second position is adjusted through the movement of the second plate.

3. The image pickup apparatus as claimed in claim 1, wherein the second plate having a first arc surface and a second arc surface opposite the first arc surface, and a thickness between the first arc surface and the second arc surface is continuously decreased across the second plate.

4. The image pickup apparatus as claimed in claim 1, wherein the first plate and the second plate have an identical sectional shape.

5. The image pickup apparatus as claimed in claim 1, wherein each of the first plate and the second plate is made of plastic or glass.

6. The image pickup apparatus as claimed in claim 1, wherein the first plate is fixed.

7. The image pickup apparatus as darned in claim 1, further comprising:
   an image sensor for receiving the optical image and converting the optical image into at least one electric signal.

8. An image pickup apparatus, comprising:
   a focusing lens for focusing light beams from at least one subject to form an optical image; and
   an optical filter disposed in a light path of the light beams for transmitting the light beams focused by the focusing lens, and the optical filter comprising:
     a first plate disposed adjacent to the focusing lens; and
     a second plate disposed adjacent to the first plate, the light beams focused by the focusing lens passing through the first plate and the second plate, and the second plate being rotated and entirely moved to different positions relative to the first plate to vary a total optical path length between the focusing lens and an image sensor.

9. The image pickup apparatus as claimed in claim 8, wherein the first plate has an arc surface, and the second plate is rotated alongside the arc surface of the first plate.

10. The image pickup apparatus as claimed in claim 8, wherein the second plate has a first arc surface and a second arc surface opposite the first arc surface, and a thickness between the first arc surface and the second arc surface is continuously decreased across the second plate.

11. The image pickup apparatus as darned in claim 8, wherein each of the first plate and the second plate is an arc-shaped plate.

12. An image pickup apparatus, comprising:
a focusing lens for focusing light beams from at least one subject to form an optical image;
an optical filter disposed in a light path of the light beams for transmitting the light beams focused by the focusing lens, wherein the optical filter comprises:
  a first plate having an arc surface disposed adjacent to the focusing lens; and
  a second plate having an arc surface disposed adjacent to the first plate, the light beams focused by the focusing lens passing through the first plate and the second plate in succession, and a radius of curvature of the arc surface of the first plate is substantially the same as a radius of curvature of the arc surface of the second plate; and
a driver for rotating the second plate, and the second plate being rotated and entirely moved to different positions alongside the arc surface of the first plate to vary an optical path length.

\* \* \* \* \*